Nov. 4, 1969     L. E. DUNLAP     3,476,161
TOOL GUIDE SUPPORT AND SAW GUARD
Filed Oct. 21, 1966     3 Sheets-Sheet 1
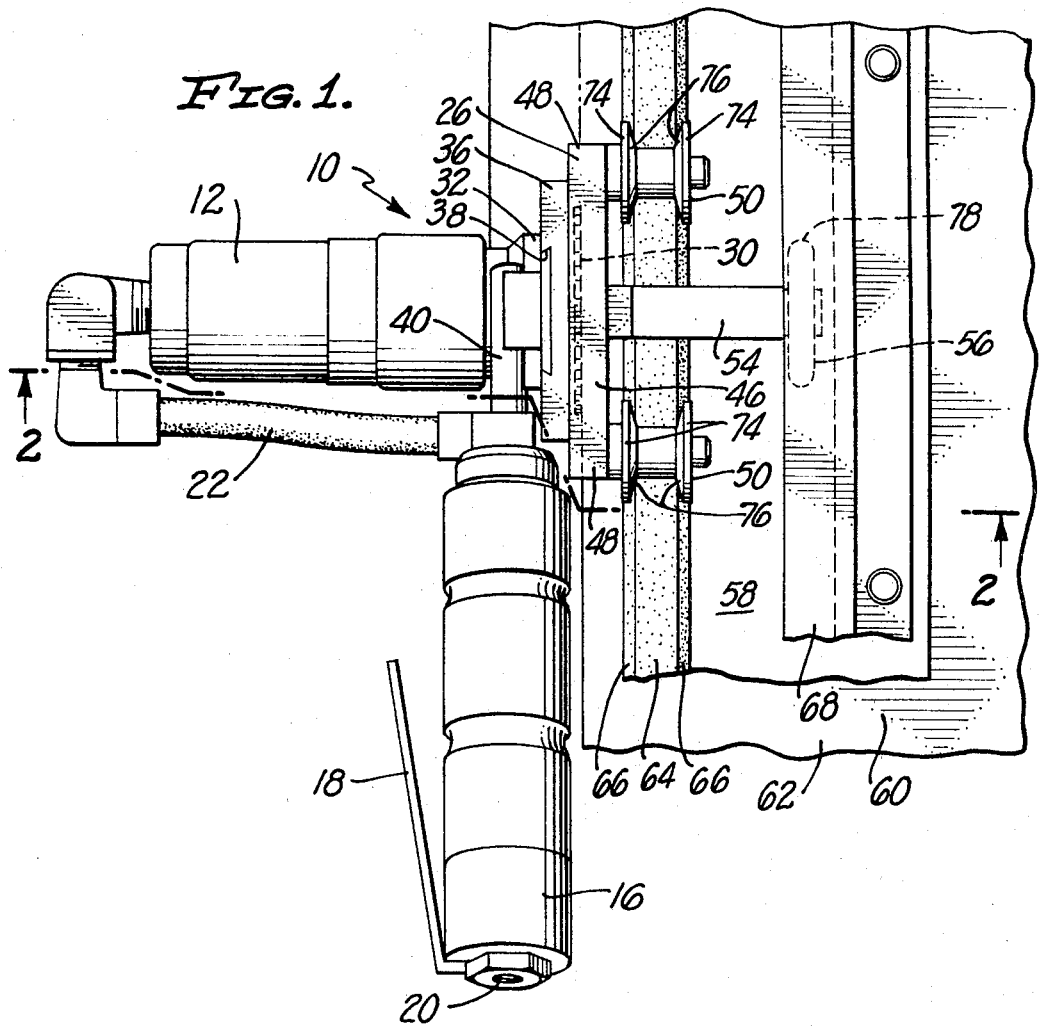
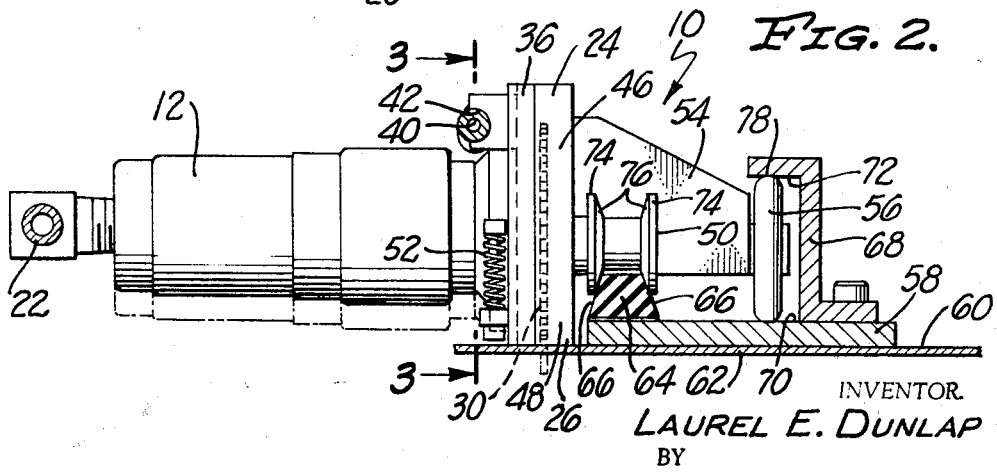
INVENTOR.
LAUREL E. DUNLAP
BY
MAHONEY & HORNBAKER
ATTORNEYS Nov. 4, 1969 L. E. DUNLAP 3,476,161
TOOL GUIDE SUPPORT AND SAW GUARD
Filed Oct. 21, 1966 3 Sheets-Sheet 2
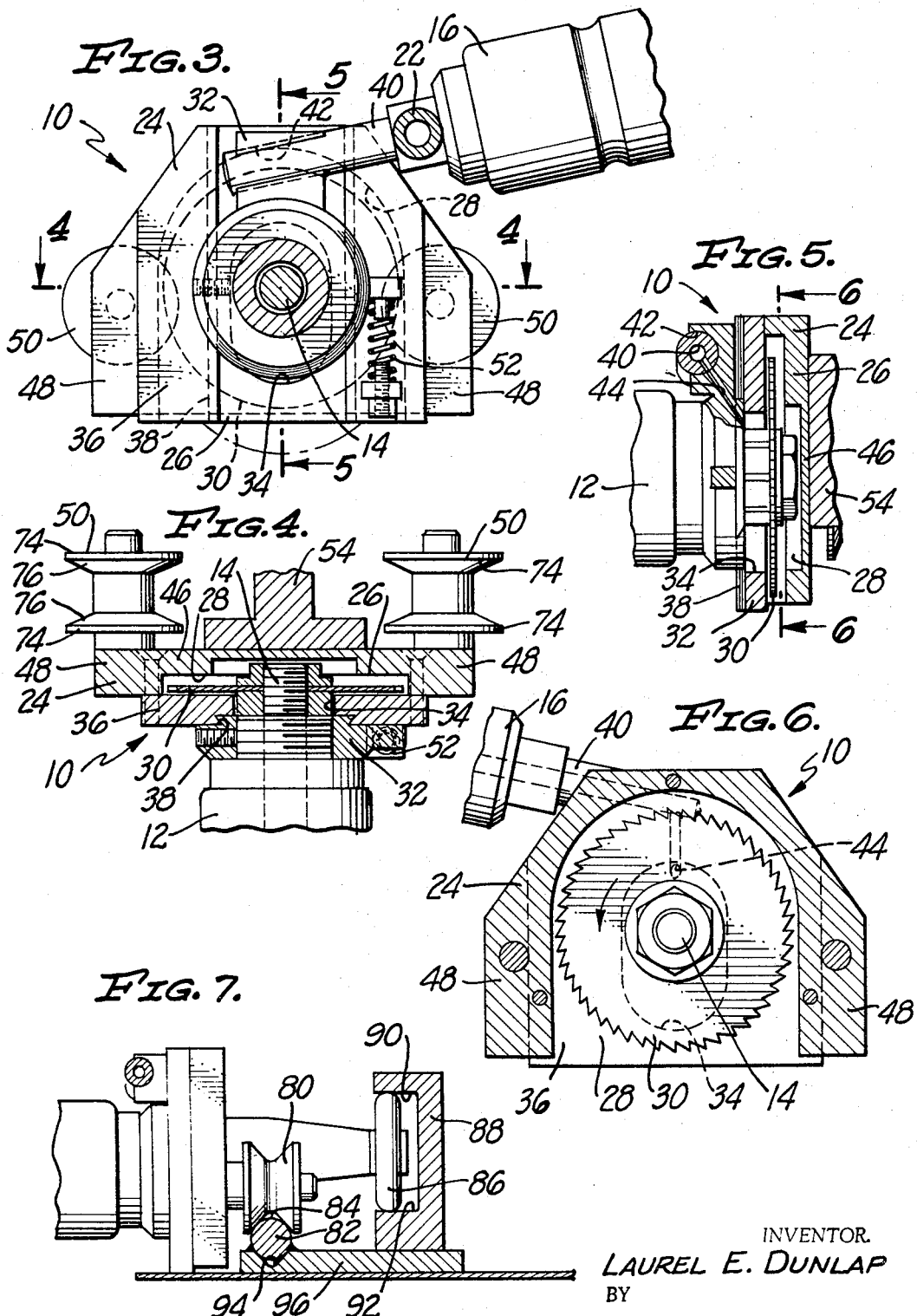
INVENTOR.
LAUREL E. DUNLAP
BY
MAHONEY & HORNBAKER
ATTORNEYS

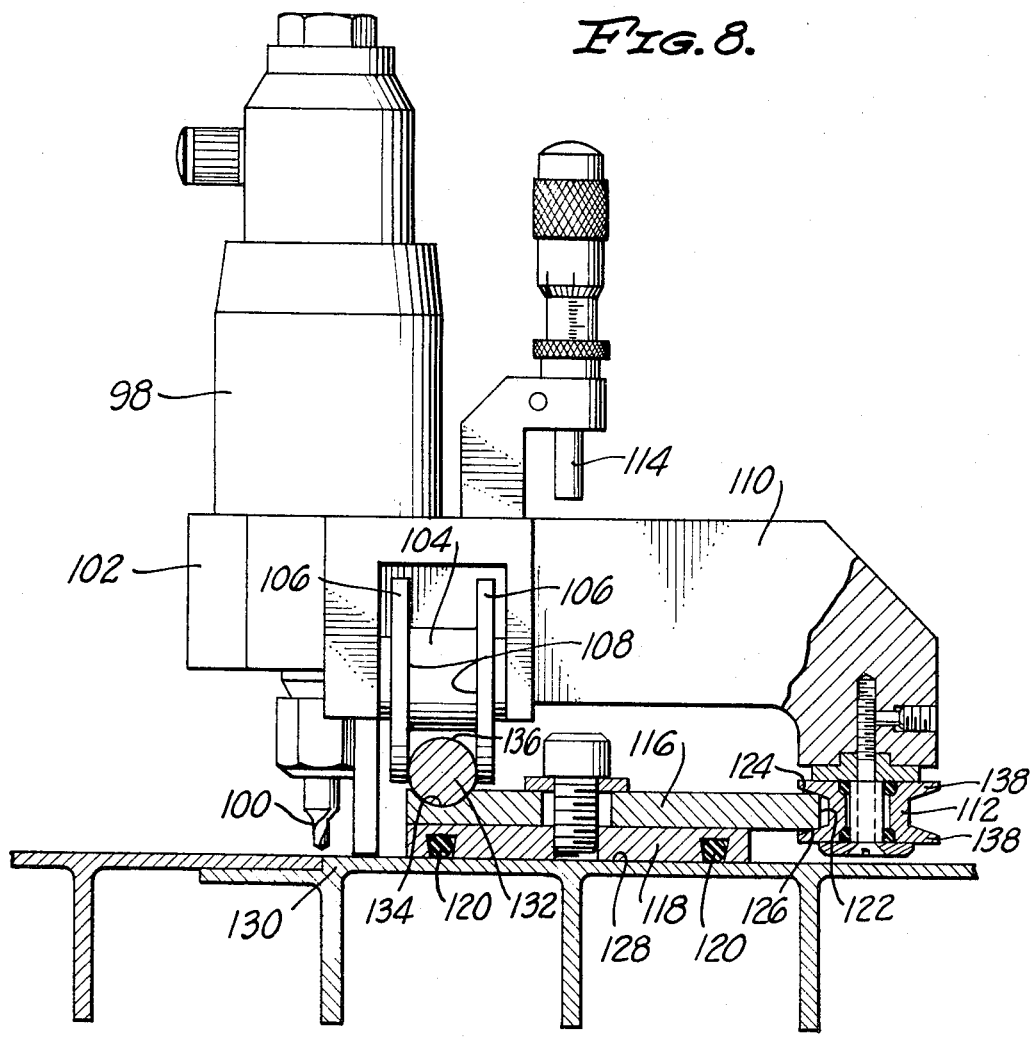
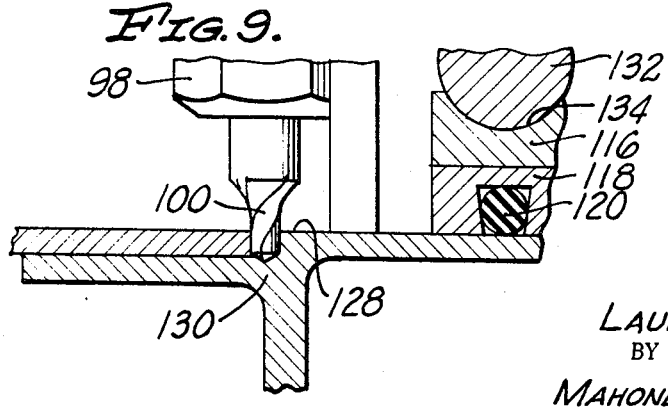

3,476,161
TOOL GUIDE SUPPORT AND SAW GUARD
Laurel E. Dunlap, 4510 Mary Ellen Ave.,
Sherman Oaks, Calif. 91403
Filed Oct. 21, 1966, Ser. No. 588,547
Int. Cl. B27c 5/02
U.S. Cl. 144—144      14 Claims

ABSTRACT OF THE DISCLOSURE

A support plate overlies a workpiece transversely adjacent a longitudinal path of working operation on said workpiece, said support plate mounting a longitudinally extending guide track transversely spaced from said path of working operation. A tool is supported on peripherally grooved guide rollers which rest downwardly on and are at least transversely engaged by the guide track, being free for upward movement away from the guide track. A support roller is transversely spaced from the path of working operation a greater distance than said guide rollers and is at least vertically engaged by the support plate cooperating with the guide rollers to provide longitudinal movement for the tool. The entire assembly may be removed from the support plate by upwardly disengaging the guide rollers from the guide track and then transversely shifting the entire assembly to remove the support roller from its engagement with the support plate. The tool may be a saw with at least the saw blade reciprocally extendable from a normally covering tool guard and the tool guard may include air jet means forcibly exhausting the same.

---

This invention relates to tool guide support and saw guard construction particularly applicable for use on various forms of power tools, the saw guard per se being useable on a power saw. More particularly, this invention relates to a tool guide support construction and a saw guard construction, either of which may be applied separately to tools, preferably power tools, or the constructions may be used in combination, all for providing unique advantages.

Various prior forms of tool guide supports have been proposed for mounting tools, such as power tools, movable along a particular predetermined path of working operation for performing various working functions on workpieces. The various required functions of these tool guide supports is that the tool must be guided in a predetermined path and at the same time, means must be provided for properly supporting the tool, which means must either be positioned on the workpiece surface or closely adjacent thereto.

One of the major difficulties with the prior proposed constructions is that, in order to provide the function of properly supporting the tool relative to the workpiece, these prior constructions have necessarily included various supporting members which extend to both sides of the line of working operation along which the tool must move. This results in the actual working area and the tool during the working operation being hidden from view and it is many times impossible to determine if the work is being properly performed by the tool.

Also, in many cases where dangerous tools such as power saws are used, and particularly where supported in this manner, the working portion of the tool such as the saw blade is left exposed. This obviously creates a danger and hazard to a workman which must remain close to the work in order to be sure that the same is properly performed by the power tool.

It is, therefore, an object of my invention to provide tool guide support particularly adaptable to power tools which supports the tool guided movable along a predetermined path of working operation along a workpiece surface in which virtually the entire supporting structure for the tool is positioned at one side of this path of working operation so that the opposite side remains completely exposed and it is easy for a workman to properly observe the work being performed. This is accomplished by providing the guide support as an outrigger guide support in which the tool is guided by a particularly positioned guide track and the additional movable support is spaced transversely from this guide track at the same side of and a greater distance away from the path of working operation. Furthermore, where this outrigger support is used, in view of the fact that the weight of the tool is supported generally directly over the path of working operation, it is necessary to provide the support for the tool with some form of movable engagement such that the tool is prevented from pivoting around the guide track.

It is a further object of my invention to provide guide support for tools supporting the tools movable along a guide track positioned transversely spaced from one side of the path of working operation in which the tools may be removably supported on the surface of the workpiece so that when the working operation is complete, the entire construction including the tools and the tool guide supports therefore may be quickly removed from the workpiece and without damage thereto. In one form of the present invention the portion of the guide support which rests on the workpiece surface is formed by a plate, which plate may be removably secured to the workpiece by temporary securing means, such as various of the present day adhesives. In another form of the present invention, the portion of the tool guide support resting on the workpiece surface is a vacuum plate which, when vacuum is applied, securely retains the entire tool and guide support on the workpiece surface, yet merely by releasing the vacuum, the entire construction may be quickly removed.

Still a further object of my invention is to provide a tool guide support of the foregoing type in which the tool may be mounted movable reciprocally toward and away from the workpiece surface upon which the work is to be performed by the tool. This is accomplished by providing a reciprocal connection between the guide support and the tool so that the guide support can perform the functions of guiding the tool along the workpiece while properly supporting the same, yet the tool may be reciprocally movable relative thereto and toward and away from the workpiece surface.

It is also an object of my invention to provide a tool guard for guarding that portion of the tool performing the work so as to provide safe working conditions for a worker charged with operating the tool. This tool guard construction necessarily includes means between the tool and tool guard for providing relative reciprocal movement so that the tool may be moved toward and away from the workpiece surface. Furthermore, this tool guard construction may be incorporated with the foregoing tool guide support so that the tool will be provided with a proper guide and support along the workpiece surface and along a predetermined path of working operation, yet the working portion of the tool will be properly guarded for the workman's safety.

Additionally, it is an object of my invention to provide a tool guard of the foregoing type having an air jet positioned directly into the interior thereof so as to expel from the interior of the tool guard the various materials removed from the workpiece by the tool and prevent a buildup of such materials which could prevent the proper carrying out of the working operation.

Other objects and advantages of the invention will be apparent from the following specification and the accompanying drawings which are for the purpose of illustration only, and in which:

FIG. 1 is a top plan view showing the combined tool guide support and guard construction of the present invention with the tool being a saw and the guide support mounting the saw directly on a typical workpiece surface;

FIG. 2, a vertical, sectional view, part in elevation, taken along the broken line 2—2 in FIG. 1;

FIG. 3, an enlarged, fragmentary, vertical sectional view, part in elevation, taken along the broken line 3—3 in FIG. 2;

FIG. 4, a fragmentary, horizontal, sectional view, part in elevation, taken along the broken line 4—4 in FIG. 3;

FIG. 5, a fragmentary, vertical, sectional view, part in elevation, taken along the broken line 5—5 in FIG. 3;

FIG. 6, a fragmentary, vertical, sectional view, part in elevation, taken along the broken line 6—6 in FIG. 5;

FIG. 7, a fragmentary, vertical, sectional view, somewhat similar to FIG. 2, and illustrating a second form of the tool guide support construction of the present invention;

FIG. 8, a front elevational view, part in section, illustrating a still further form of the tool guide support construction of the present invention with the tool being a router and being supported by the guide support directly on a typical workpiece surface; and FIG. 9, an enlarged, fragmentary view taken from FIG. 8 and showing the router engaged in the work piece surface and performing the working operation.

Referring to FIGS. 1 through 6 of the drawings in which a combined form of the tool guide support and guard construction of the present construction is illustrated, a power saw is generally indicated at 10 and includes an air motor 12 having the rotatable drive shaft 14, and the control handle 16 having the air control lever 18 mounted thereon. The air supply for the air motor 12 enters the air opening 20 at the rear portion of the control handle 16, the flow thereof being controlled through usual valve means, not shown, by the air control lever 18. Furthermore, this air supply passes longitudinally through the control handle 16 to the forward end thereof where the major portion enters the air supply tube 22 and flows therein to the outer end of the air motor 12 as shown.

Both the air motor 12 and control handle 16 are mounted on and supported by a support frame 24 with both being vertically reciprocal relative thereto. Also, this support frame 24 forms a tool guard, in this case a saw blade guard generally indicated at 26, which tool guard has the hollow interior 28 encompassing and substantially enclosing the rotatable saw blade 30 and opening downwardly, as best seen in FIGS. 5 and 6.

As shown in FIGS. 1, 3 and 4, the air motor 12 is mounted on a vertical mounting plate 32 with the drive shaft 14 of the air motor extending through this vertical mounting plate, through the vertically oblong opening 34 in the back plate 36 of the tool guard 26 and into the interior of this tool guard. Mounting plate 32 is vertically reciprocally connected to the back plate 36 by means of the dovetail groove 38 so that the air motor 12 may be moved reciprocally upwardly and downwardly relative to the support frame 24 and tool guard 36 to thereby move the air motor drive shaft 14 and the saw blade 30 mounted on this drive shaft upwardly and downwardly. Such downward movement of the saw blade 30 will carry this saw blade downwardly so as to project beneath the tool guard 26 and extending from the bottom opening of this tool guard.

The control handle 16 is also secured on the vertical mounting plate 32 for the vertical reciprocal motion therewith. An air tube extension 40 is formed at the forward end of this control handle 16 and is received through the angled slot 42 formed in the vertical mounting plate 32 being secured therein. As best seen in FIGS. 5 and 6, this air tube extension 40 is connected into the air supply flowing through the control handle 16 so that extension 40 diverts a portion of this air flow into an air jet opening 44 angling downwardly through the vertical mounting plate 32 and opening around the air motor drive shaft 14 into the interior of the tool guard 26 thereby providing an air jet into the interior of the tool guard for purging or exhausting the tool guard interior of any comminuted materials received therein from the saw blade 30 working on and cutting a workpiece.

The remainder of the enclosure for the tool guard 26 is formed by the front plate 46 of the support frame 24 and the back plate 36 is secured to this front plate. Also, the front plate 46 is formed with the side flanges 48 to which are rotatably secured the peripherally grooved guide rollers 50. Guide rollers 50 are longitudinally aligned and longitudinally spaced for providing a broadened support base for the saw 10 and tool guard 26. As seen in FIGS. 2 and 3, resilient means in the form of the coil spring 52 is positioned engaged between the vertical mounting plate 32 and the tool guard 26 for normally resiliently urging the vertical mounting plate and therefore the saw 10 reciprocally upwardly to an upper position in which the saw blade 30 is totally encompassed by the tool guard 26, but yet permitting downward movement of the saw 10 relative to this tool guard 26 so that the saw blade 30 can be moved downwradly through the bottom opening of the tool guard and into working engagement with a workpiece.

The outrigger arm 54 is also secured to the front plate 46 on the support frame 24 longitudinally intermediate the flanges 48 and the guide rollers 50 as best seen in FIGS. 1, 2 and 4. This outrigger arm 54 extends transversely outwardly from the front plate 46 of support frame 24 transversely beyond the longitudinal line of the guide rollers 50 and spaced transversely outwardly from the guide rollers 50 mounts the rotatable support roller 56. Thus, the guide rollers 50 are positioned spaced transversely from one side of the working area of the saw 10 and saw blade 30, while the support roller 56 is spaced transversely from this same side but a greater transverse distance from this working area, thereby providing an outrigger support for the saw 10 and tool guard 26.

As shown in FIGS. 1 and 2, a longitudinally elongated support plate 58 is positioned on the top surface 60 of the flat workpiece 62 and this support plate 58 may be secured to the workiece top surface 60 by any usual clamping means, not shown, or by any of the usual adhesives so as to be removable from this workpiece surface. A guide track 64 having a uniform transverse cross section is mounted on the support plate 58 secured thereto and uniformly spaced transversely from the line or path of working operation of the workpiece 62, that is, in this case the line along the workpiece to be cut by the saw blade 30 of the saw 10. The uniform transverse cross section of the guide track 64 provides this guide track with the transversely spaced inwardly and upwardly tapered or angled side guide surfaces 66, which surfaces extend continuously longitudinally along guide track 64.

Also mounted on the support plate 58 is the support flange 68 which is secured to this support plate and extends longitudinally spaced uniformly transversely from the guide track 64 and, therefore, also spaced uniformly transversely from the path of working operation along the work piece 62. This support flange 68 is generally Z shaped in cross section so that the combination of this support flange and the support plate 58 form the vertically spaced horizontally and longitudinally extending surfaces 70 and 72. Furthermore, in view of the outrigger support of the saw 10 and tool guard 26 to be hereinafter more fully discussed, the support flange 68 is spaced transversely from the path of working operation along the workpiece 62 a greater transverse distance than the spacing of the guide track 64 so as to be properly positioned for engagement with the support roller 56 on the outrigger arm 54.

The guide rollers 50 are substantially identically formed, each having the transversely spaced flanges 74 forming the transversely spaced inner roller surfaces 76 so that these guide rollers may be engaged downwardly over the guide track 64 with the inner roller surfaces 76 of the rollers transversely engaged with the guide surfaces 66 on the guide track as shown in FIGS. 1 and 2. The support roller 56 is formed with a transverse convex outer peripheral surface 78 and the outrigger arm 54 positions this support roller engaged beneath the support flange 68 with the peripheral surface 78 upwardly engaged with the horizonal surface 70 and downwardly engaged with the horizontal surface 72. Thus, the saw 10 and tool guard 26 are supported movable along the path of working operation on the workpiece 62 by the guide rollers 50 and the support roller 56 with the guide rollers engaging the guide track 64 and guiding the saw 10 during this longitudinal movement and with the support roller movably engaged beneath the support flange 68 and preventing the weight of the saw 10 from pivoting the entire support around the guide track 64.

In this way, a longitudinally movable guide support is provided for tools, such as the saw 10, which guides the tool exactly along a path of working operation of a workpiece 62, yet the entire guide support is positioned at one side of this path of working operation, exposing the other side for observation by a workman to determine that the working operation is being properly performed. Also, this guide support provides the tool reciprocally movable toward and away from the workpiece 62, and also provides a tool guard 26 which virtually encompasses the working portion of the tool, in this case the saw blade 30, while permitting this tool to move reciprocally downwardly and upwardly from this tool guard in order that the working operation may be performed thereby.

A modified form of the tool guide support of the present invention is illustrated in FIG. 7 and in this case, the peripherally grooved guide rollers 80 engaged downwardly over a guide track 82 formed by a longitudinally extending cylindrical bar forming the arcuate guide surface 84 for engagement by the guide rollers. Furthermore, the support roller 86 is movably engaged by a slightly modified support flange 88 which is generally U shaped in transverse cross section so as to provide the vertically spaced, horizontally extending engagement surfaces 90 and 92. The rod forming the guide track 82 is received downwardly in a groove 94 formed in the top surface of the support plate 96 and is retained therein in any usual manner, such as by the welding shown. The operation of this modified form is the same as the first form described above.

Still a further modified form of the guide support construction of the present invention is illustrated in FIGS. 8 and 9 wherein the tool is a router 98 having the tool 100 and being vertically, reciprocally supported on the support frame 102. Furthermore, the support frame 102 rotatably mounts the longitudinally aligned and longitudinally spaced guide rollers 104, which guide rollers are peripherally grooved and formed with the transversely spaced guide flanges 106 forming the transversely spaced guide surfaces 108. The support frame 110 also mounts the transversely extending outrigger arm 102 which extends transversely outwardly and then downwardly for rotatably mounting the support roller 112. A selectively adjustable micrometer stop 114 may be mounted movable reciprocally with the router 98 and engageable against the outrigger arm 110, as shown in FIG. 8.

The support plate 116 is secured to a vacuum plate 118 having the spaced circular cross section seals 120 and mounting the support plate so as to provide the support plate with the transversely exposed, longitudinally extending edge 122 forming the vertically spaced, generally horizontal surfaces 124 and 126. This vacuum plate 118 is generally of usual construction and removably secures the support plate 116 on the surface 128 of the workpiece 130, that is, when the vacuum is applied to the vacuum plate 118, the vacuum plate will secure the support plate 116 immovable on the workpiece surface 128, yet when the vacuum is released, the support plate with this vacuum plate may be easily removed from the workpiece surface. The guide track 132 is again formed by a cylindrical rod and is received in a groove 134 formed in the support plate 116 so that the guide rollers 104 may be received downwardly over this guide track with the guide roller guide flanges 106 straddling the guide track and with the guide roller guide surfaces 108 transversely engaged with the arcuate surface 136 of the guide track.

The support roller 112 is also formed with a grooved outer peripheral surface so as to provide the spaced flanges 138. In this case, the support roller 112 is mounted by the outrigger arm 110 with the axis thereof extending vertically, rather than horizontally, as in the two previous forms of the present invention described above, and this support roller is transversely engaged over the support plate exposed edge 122, with the support roller flanges 138 engaged beneath and above the edge horizontal surfaces 124 and 126.

Thus, in this form of the tool guide support of the present invention, the tool, in this case the router 98, is mounted reciprocal relative to the workpiece 130 so that the router tool 100 may be engaged into the workpiece surface 128, as shown in FIG. 9. At the same time, this router 98 is supported movable longitudinally exactly along the path of working operation on the workpiece 130, being supported and guided all at one side of the router so as to expose the other side for clear viewing by workmen supervising the working operation. Finally, the router 98 with the entire tool guide support including the guide rollers 104, the outrigger arm 110, the support roller 112, the support plate 116 and the guide track 132 are all movably mounted on the workpiece surface 128 by the vacuum plate 118, which may be selectively operated for securing this mechanism to the workpiece 130 during the working operation, yet may be released for quickly removing the same from the workpiece.

I claim:

1. In a guide support for tools mounting a tool movable along a predetermined longitudinal path over a workpiece surface and conforming to a predetermined path of working operation, the combination of: a tool having means thereon for performing a working operation on a workpiece; a guide track, means mounting said guide track extending longitudinally along and uniformly transversely spaced from one side of said predetermined path of working operation; support and guide means mounting said tool over and movable longitudinally along said predetermined path of working operation, said support and guide means including guide means operably connected to said tool and engaged resting downwardly over and at least transversely engaged by said guide track for movement longitudinally along said guide track to guide said tool longitudinally along said predetermined path of working operation, said guide means being engaged downwardly over said guide track solely by gravity and at all times being free to move upwardly and clear of said guide track upon a force being exerted thereon opposing said gravity, support means operably connected to said tool for supporting said tool with said guide means engaged resting downwardly over and movable longitudinally along said guide track, means mounting said support means longitudinally movable uniformly transversely spaced from said one side of said path of working operation a transverse distance greater than said uniform transverse spacing of said guide track from said one side of said predetermined path of working operation, and means at least vertically engaged with said support means for longitudinal movement of said support means relative thereto and resisting upward movement of said support means in pivoting about said guide track as a center during said longitudinal movement, said support and guide means being movable completely free of said guide means guide track and said means engaged with said support means by first moving said guide means upwardly free of said guide track and then shifting said support means transversely free of said means engaged therewith.

2. In a guide support for tools as defined in claim 1 in which said support means includes a roller having the axis thereof extending horizontally; and in which said means engaged with said support means includes vertically spaced horizontally extending surfaces, one vertically aligned underlying and one vertically aligned overlying said support means roller and vertically engaged therewith.

3. In a guide support for tools as defined in claim 1 in which said support means includes a roller having the axis thereof extending vertically, said roller having a grooved peripheral surface; and in which said means engaged with said support means includes a horizontally extending plate having a longitudinally extending edge, said support means roller being transversely and vertically engaged above and below said plate edge with said plate edge being received in said roller grooved peripheral surface.

4. In a guide support for tools as defined in claim 1 in which said means mounting said guide track includes support plate means; and in which said means vertically engaged with said support means includes generally vertically aligned and spaced portions of said support plate means, one portion facing downwardly and the other facing upwardly.

5. In a guide support for tools as defined in claim 1 in which said means mounting said guide track includes support plate means; in which said support means includes a roller having the axis thereof extending horizontally; and in which said means engaged with said support means includes vertically spaced horizontally extending portions of said support plate means, one portion vertically aligned underlying and one portion vertically aligned overlying said support means roller and vertically engaged therewith.

6. In a guide support for tools as defined in claim 1 in which said means mounting said guide track includes support plate means; in which said support means includes a roller having the axis thereof extending vertically, said roller having a grooved peripheral surface opening generally horizontally; and in which said support means includes a horizontally extending portion of said support plate means having a longitudinally extending edge, said support means roller being transversely engaged with said plate portion edge above and below said edge and with said plate portion edge being received in said roller grooved peripheral surface.

7. In a guide support for tools as defined in claim 1 in which said means mounting said guide track includes support plate means; in which said means engaged with said support means includes vertically spaced and aligned portions of said support plate means; and in which said support plate means is removably mounted on said workpiece by vacuum means, said vacuum means being selectively operable for reaining said support plate means on said workpiece and aligned with said path of working operation.

8. In a guide support for tools as defined in claim 1 in which said means mounting said guide track includes support plate means; in which said guide means includes a peripherally grooved roller; and in which said guide track includes a longitudinally extending cylindrical rod having an arcuate exposed upper surface, said guide means being engaged resting downwardly over said guide track exposed upper surface with said guide track partially received in said roller grooved surface transversely restricting and longitudinally guiding said roller.

9. In a guide support for toools as defined in claim 1 in which said means mounting said guide track includes support plate means; in which said guide track includes transversely spaced, longitudinally extending, angled side surfaces; and in which said guide means includes a peripherally grooved roller, said roller being engaged restinng downwardly over said guide track with said guide track angled surfaces engaged in said roller grooved periphery transversely restricting and longitudinally guiding said roller.

10. In a guide support for tools mounting a tool movable along a predetermined longitudinal path over a workpiece surface and conforming to a predetermined path of working operation, the combination of: a tool having means thereon for performing a working operation on a workpiece; a guide track, means mounting said guide track extending longitudinally along and uniformly transversely spaced from said pretermined path of working operation; support and guide means mounting said tool over and movable longitudinally along said predetermined path of working operation, said support and guide means including guide means engaged resting downwardly over and at least transversely engaged by said guide track for movement longitudinally along said guide track to guide said tool longitudinally along said predetermined path of working operation, said guide means being engaged downwardly over said guide track solely by gravity and at all times being free to move upwardly and clear of said guide track upon a force being exerted thereon opposing said gravity, and support means transversely spaced from said guide means for supporting said tool with said guide means engaged resting downwardly over and movable longitudinally along said guide track, said support means being secured transversely to said guide means with said support means engaging and being vertically restricted by said means mounting said guide track, said support and guide means being movable completely free of said guide means guide track and said means mounting said guide track by first moving said guide means upwardly free of said guide track and then shifting said support means transversely free of said means mounting said guide track; and means mounting said tool on said support and guide means with at least said means of said tool for performing said working operation selectively reciprocally movable toward and away from said workpiece.

11. In a guide support for tools as defined in claim 10 in which said means mounting said tool on said support and guide means includes a tool guard normally encompassing said means of said tool for performing said working operation, said tool guard being normally vertically stationary relative to said workpiece and having a bottom opening directly vertically overlying said workpiece, and means operably connecting said tool to said tool guard for selective reciprocal movement of said means of said tool for performing said working operation relative to said tool guard through said tool guard bottom opening toward and away from said workpiece.

12. In a guide support for tools as defined in claim 10 in which said means mounting said tool on said support and guide means includes a tool guard normally encompassing said means of said tool for performing said working operation, said tool guard being normally vertically stationary relative to said work piece and having a bottom opening directly vertically overlying said work piece, and means operably connecting said tool to said tool guard for selective reciprocal movement of said means of said tool for performing said working operation relative to said tool guard through said tool guard bottom opening toward and away from said work piece; and in which said tool is a saw, said means of said tool for performing said working operation being a saw blade.

13. In a guide support for tools as defined in claim 10 in which said means mounting said tool on said support and guide means includes a tool guard normally encompassing said means of said tool for performing said working operation, said tool guard being normally vertically stationary relative to said work piece and having a bottom opening directly vertically overlying said work piece, and means operably connecting said tool to said tool guard for selective reciprocal movement of said means of said tool for performing said working operation relative to said tool guard through said tool guard bottom opening toward and away from said work piece; in which said tool is a saw, said means of said tool for performing said working operation being a saw blade; and in which said tool includes an air jet directed interiorly into said tool guard, means positioning said air jet for exhausting portions of said work piece cut by said saw blade from said tool guard.

14. In a guide support for tools mounting a tool movable along a predetermined longitudinal path over a work piece surface and conforming to a predetermined path of working operation, the combination of: a tool having means thereon for performing a working operation on a work piece; a guide track; a support plate; vacuum means operably connected to said support plate for removably mounting said support plate on the work piece surface extending longitudinally along and transversely spaced from said predetermined path of working operation; means mounting said guide track on said support plate extending longitudinally along and uniformly transversely spaced from said predetermined path of working operation; and support and guide means mounting said tool over and movable longitudinally along said predetermined path of working operation, said support and guide means including guide means operably connected to said tool and engaged resting downwardly over and at least transversely engaged by said guide track for movement longitudinally along said guide track to guide said tool longitudinally along said predetermined path of working operation, said guide means being engaged downwardly over said guide track solely by gravity and at all times being free to move upwardly and clear of said guide track upon a force being exerted thereon opposing said gravity, and support means transversely spaced from said guide means operably connected to said tool for supporting said tool with said guide means engaged resting downwardly over and movable longitudinally along said guide track, said support means being secured transversely to said guide means with said support means engaging and being vertically restricted by said support plate, said support and guide means being movable completely free of said guide track and said support plate by first moving said guide means upwardly free of said guide track and then shifting said support means transversely free of said support plate.

References Cited

UNITED STATES PATENTS 2,371,401   3/1945   Martin.

DONALD R. SCHRAN, Primary Examiner

U.S. Cl. X.R.

83—483; 90—12; 143—47